United States Patent [19]

Montgomery

[11] Patent Number: 4,661,774

[45] Date of Patent: Apr. 28, 1987

[54] METHOD AND APPARATUS FOR MONITORING FILM THICKNESS BETWEEN ROTATABLE ROLLS

[75] Inventor: Robert M. Montgomery, Indialantic, Fla.

[73] Assignee: Harris Graphics Corporation, Melbourne, Fla.

[21] Appl. No.: 560,324

[22] Filed: Dec. 12, 1983

[51] Int. Cl.⁴ .................. G01B 7/10; G01R 33/12
[52] U.S. Cl. ............................ 324/231; 324/226; 324/227; 324/239
[58] Field of Search ............... 324/207, 208, 225, 226, 324/227, 228, 229–243, 61 R

[56] References Cited

U.S. PATENT DOCUMENTS

| | | | |
|---|---|---|---|
| 2,703,384 | 3/1965 | Rendel | 324/230 |
| 3,662,576 | 5/1972 | Girlatschek | 324/229 X |
| 3,683,273 | 8/1972 | Behr et al. | 324/229 X |
| 3,857,095 | 12/1974 | Mitchie et al. | 324/230 X |
| 3,866,115 | 2/1975 | Lewis | 324/231 |
| 3,902,114 | 8/1975 | Alich | 324/228 X |
| 3,922,599 | 11/1975 | Steingroever et al. | 324/230 |
| 4,345,203 | 8/1982 | Vermeiren et al. | 324/61 R |

FOREIGN PATENT DOCUMENTS 242407 4/1969 U.S.S.R. .............................. 324/231

OTHER PUBLICATIONS

French article "Measurement without a Contact", *CETIM-Informations*, -No. 76, pp. 94–98.

*Primary Examiner*—Reinhard J. Eisenzopf
*Assistant Examiner*—Warren S. Edmonds
*Attorney, Agent, or Firm*—Tarolli, Sundheim & Covell

[57] ABSTRACT

An improved method and apparatus for monitoring the thickness of a film includes a sensor roll which cooperates with a compliant roll to form a nip through which the film passes. As the two rolls rotate relative to each other, magnets disposed in the sensor roll are sequentially moved to and from the nip. As a magnet moves by the nip, the field emanating from the magnet is concentrated by a body of material having a relatively high magnetic permeability and disposed in the compliant roll. This results in an induced voltage being generated in a sensor coil. The output from the sensor coil is transmitted to control circuitry which effects operation of a suitable apparatus to control the thickness of the film.

16 Claims, 7 Drawing Figures

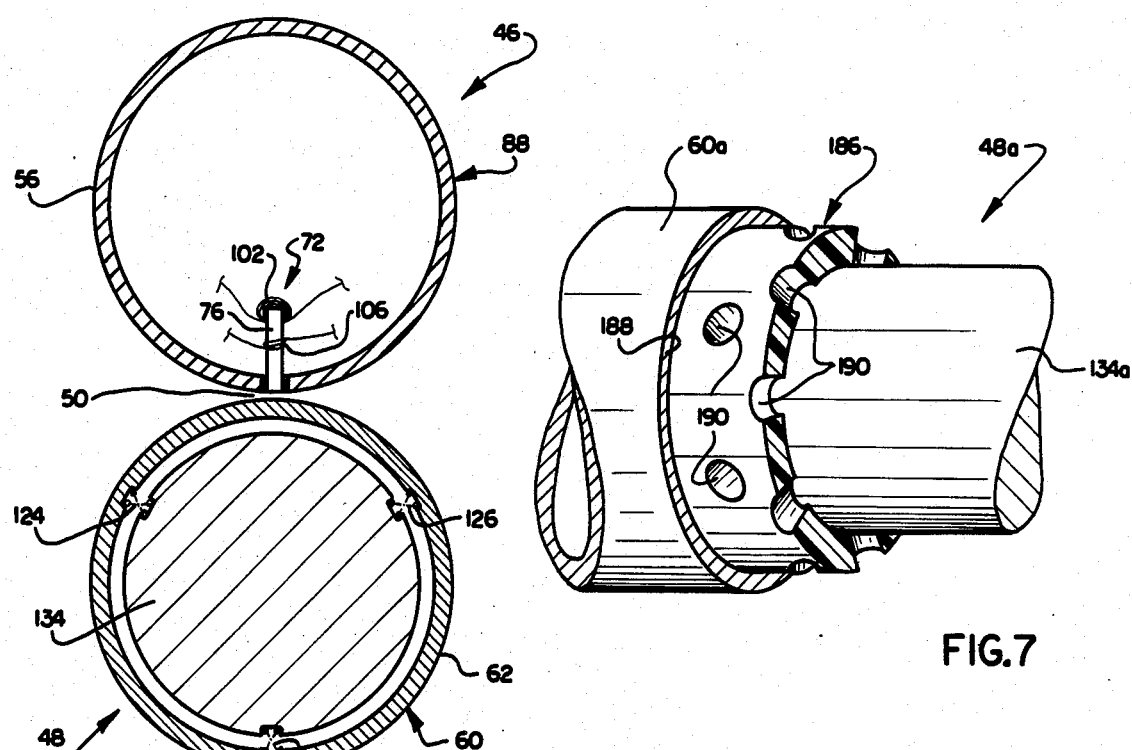
FIG.3
FIG.7
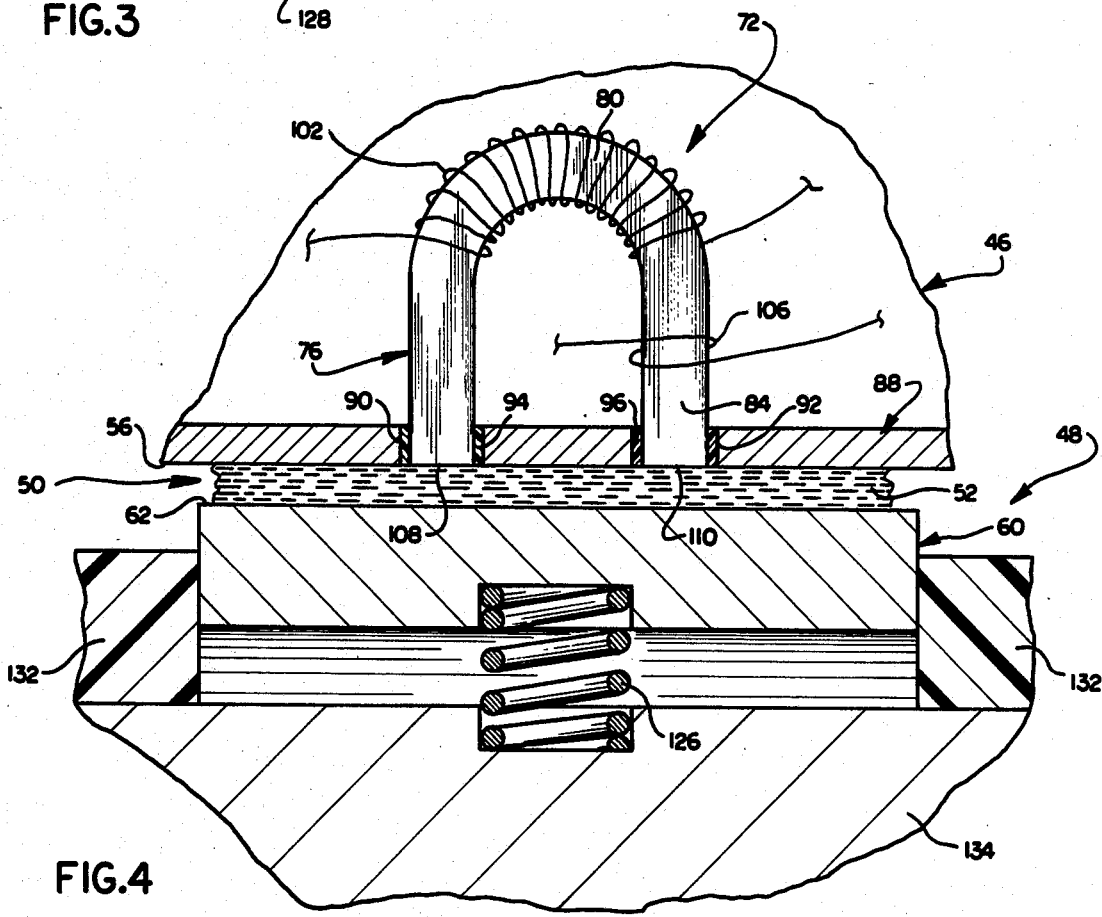
FIG.4

METHOD AND APPARATUS FOR MONITORING FILM THICKNESS BETWEEN ROTATABLE ROLLS

BACKGROUND OF THE INVENTION

The invention relates to a method and an apparatus for monitoring the thickness of a film. More specifically, the invention relates to a method and an apparatus for providing information representative of the thickness of an ink film in a printing press.

Many known devices provide information about the thickness of a film. In some known devices, electrical transducers are used. The transducers may be of the type which have electrical properties that vary in dependence upon the thickness of the film. The transducer may sense changes in inductance, capacitance or resistance caused by changes in the thickness of the film passing thereby.

U.S. Pat. No. 3,857,095 discloses an electromagnetic sensor whose inductance changes with changes in the thickness of an ink film on a roller which supplies ink to a printing roll. In U.S. Pat. No. 4,345,203, a capacitance transducer is used for measuring the thickness of a film of lubricant between two relatively rotatable surfaces. With these known devices, the measured electrical properties may vary significantly with variations in the electrical properties of the film. Therefore, the measured properties could vary significantly with variations in density, water content, temperature, etc. of a liquid film.

One of the ways to alleviate these problems is to use magnetic reluctance sensing. Under this method, a magnetic flux is established between a member that carries the film and a member that carries a magnetic transducer for sensing variations in the film thickness. Such a transducer generally includes a core and an excitation coil associated with the core to establish a magnetic flux across the film. A sensing means senses variations in the magnetic flux resulting from changes in the thickness of the film. Such devices are shown for example in U.S. Pat. No. 3,922,599.

A magnetic transducer for measuring the thickness of a lubricant film in a bearing is described in the French article "Measuring without A Contact", CETIM-Informations, No. 76. In this transducer, a U-shaped core is employed with core legs facing the film of lubricant. Excitation and sensing coils are mounted around the core.

It is known that the reluctance of a magnetic circuit is:

$$R = \frac{l}{M_o A}\left[\frac{L_m}{M_e} + 2d\right], \qquad \text{(Equation 1)}$$

where:
A is the area of the pole face,
$M_o$ is the free space permeability,
$M_e$ is the permeability of the magnet alloy,
$L_m$ is length of the magnetic core, and
d is the distance or gap from the core to the liquid film carrying member. (The gap appears at each pole of a U-shaped core, hence the factor of 2.)
Generally, $M_e$ is significantly greater than $L_m$, therefore, the first term in brackets is quite small and can be neglected.

The magnetic flux is determined from an equation:

$$Q = \frac{F}{R}, \qquad \text{(Equation 2)}$$

where F is the magneto-motive force and is equal to $N_c I$, where $N_c$ is number of turns of the excitation coil, and I is the current.

Substituting R for its expression, the magnetic flux will be:

$$Q = \frac{M_o N_c I A}{2d} \qquad \text{(Equation 3)}$$

The voltage induced in the sensing coil is:

$$V = N_S \frac{dQ}{dt}, \qquad \text{(Equation 4)}$$

where $N_S$ is number of turns in the sensing coil.

Substituting dQ for its expression (Equation 3) the induced voltage is:

$$V = \frac{M_o N_c N_S A}{2} \frac{d}{dt}\left(\frac{I}{d}\right) \qquad \text{(Equation 5)}$$

In known methods, d is generally kept constant, and generation of voltage occurs by changing the current, I.

Many prior art film thickness measuring devices use alternating current to energize an excitation coil of an electromagnet. However, the use of alternating current results in parasitic flux in the transducer. The presence of the parasitic flux in a transducer does not allow a number of transducers to be connected in series. Such a series connection is generally advantageous when the thickness of a liquid film has to be determined at predetermined positions across the width of the film.

SUMMARY OF THE PRESENT INVENTION

The present invention provides a method and apparatus for monitoring the thickness of a film. The apparatus includes a sensor roll and a compliant roll which cooperate to define a nip through which the film passes. Each magnet of a series of magnets on the sensor roll is moved in turn past the nip. Each of the magnets is of a constant magnetic excitation and cooperates with a body of material having a relatively high magnetic permeability as it passes by the nip. As the magnet is moved by the nip, the magnetic field is concentrated and an induced magnetic flux change is generated in a sensor coil. The maximum magnitude of the induced magnetic flux change varies as an inverse function of the thickness of the film at the portion of the nip between the magnet and the compliant roll.

Although a film thickness monitor assembly constructed in accordance with the present invention can be used in many different environments to detect the thickness of either liquid or solid films, the assembly is advantageously used in a printing press to detect the thickness of a liquid film of ink applied to a plate cylinder. When the film thickness monitor assembly is used in a printing press, the output from the sensor coil is transmitted to control circuitry which effects operation of ink fountain keys to maintain a desired film thickness. The magnets are advantageously arranged in an arry in the sensor roll to obtain a series multiplexing action due to movement of each magnet in a predetermined pattern past the clip. A preferred embodiment would be a helical array althouguh any other providing a decodable input would suffice.

Accordingly, it is an object of this invention to provide a new and improved method and apparatus for monitoring the thickness of a film and wherein a magnet is moved relative to a body of material having a relatively high magnetic permeability to generate an induced voltage which is a function of the thickness of the film.

Another object of this invention is to provide a new and improved method and apparatus for monitoring the thickness of a film which moves through a nip formed between a pair of rolls and wherein an induced voltage having a magnitude representative of the thickness of the film is generated by rotating the magnet with one of the rolls.

BRIEF DESCRIPTION OF THE DRAWINGS

The foregoing and other objects and features of the present invention will become more apparent upon a consideration of the following description taken in connection with the accompanying drawings wherein:

FIG. 3 is a sectional view, taken generally along the line 3—3 of FIG. 2, illustrating the relationship between a magnet in the sensor roll and a ring of material having a relatively high magnetic permeability disposed on the compliant roll, the magnet being disposed adjacent a nip between the sensor and compliant rolls;

FIG. 4 is an enlarged fragmentary schematic illustration depicting the relationship between an ink film, a magnet disposed on the sensor roll and a ring of material having a high magnetic permeability on the compliant roll as the magnet moves past the nip between the sensor and compliant rolls;

FIG. 7 is a fragmentary illustration of a second embodiment of the compliant roll.

DESCRIPTION OF SPECIFIC PREFERRED EMBODIMENTS OF THE INVENTION

General Description

Figure 1:
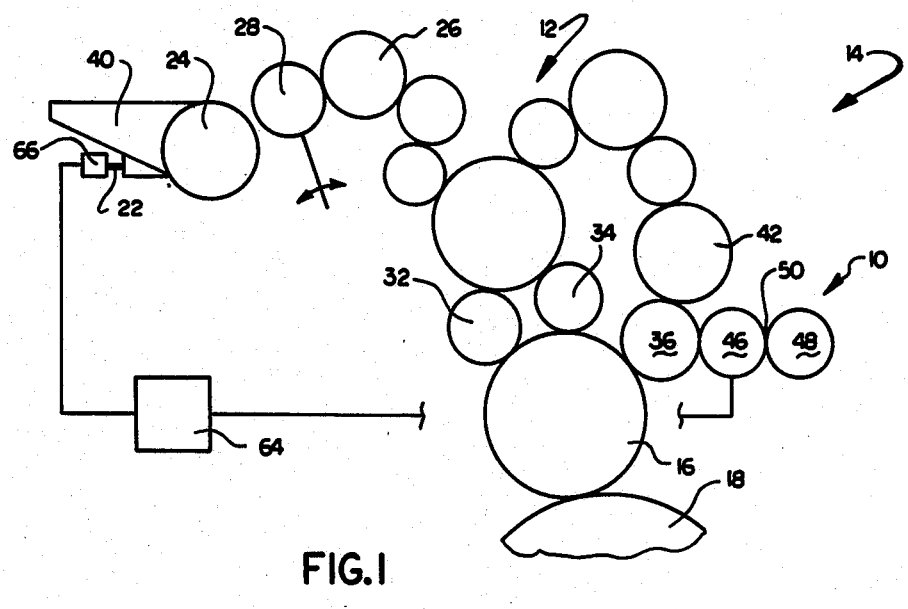
FIG. 1 is a schematic illustration of a printing press inker having a film thickness monitor assembly constructed in accordance with the present invention.

A film thickness monitor assembly 10 is illustrated in FIG. 1 in association with an inker 12 of a printing press 14. The film thickness monitor assembly 10 cooperates with the inker 12 to control the thickness of a liquid film of ink applied to a top plate cylinder 16 and a top blanket cylinder 18 of the printing press 14. Although the film thickness monitor assembly 10 is used in the printing press 14 to control the thickness of a liquid film of ink, the film thickness monitor assembly could be used in other environments in association with either liquid or solid films.

In the printing press 14, information provided by the film thickness monitor assembly 10 in regard to the thickness of the film of ink being applied to the plate cylinder 16 is used to adjust the position of ink fountain keys 22. Adjusting the position of the ink fountain keys 22 varies the amount of ink transmitted by a ductor roll 28 from an ink fountain roller 24 to a first roll 26 in a train of vibrator and intermediate rolls. The ink film transmitted from the fountain roll 24 to the train of inker rolls is applied to the plate cylinder 16 by ink form rolls 32, 34, and 36.

Although only a single ink fountain key 22 has been illustrated in FIG. 1, it should be understood that a plurality of ink fountain keys 22 are arranged in a linear array along an ink fountain blade. The ink fountain keys 22 are actuated to control the amount of ink transmitted from a reservoir 40 to the ink fountain roll 24 in a manner hich is generally similar to that disclosed in U.S. Pat. No. 3,747,542. It should also be understood that although the film thickness monitor assembly 10 has been shown in FIG. 1 as cooperating with the form roll 36, the film thickness monitor assembly 10 could cooperate with other rolls in the inker 12 to monitor the thickness of the film of ink being applied to the plate cylinder 16. For example, the film thickness monitor assembly 10 could cooperate with the vibrator roll 42 if desired.

Film Thickness Monitor Assembly

The film thickness monitor assembly 10 includes a cylindrical sensor roll 46 (see FIGS. 1 and 2) and a cylindrical compliant roll 48 which cooperate to define a nip 50 (FIGS. 3 and 4) through which a liquid film 52 of ink passes (FIG. 4). The hollow sensor roll 46 has a cylindrical outer side surface 56 which engages one side of the ink film 52 (FIG. 4). The compliant roll 48 includes a plurality of annular members 60 (FIG. 2) having cylindrical outer side surfaces 62 (FIG. 4) which engage the opposite side of the ink film 52.

During operation of the printing press 14, the sensor roll 46 is rotated about its central axis by engagement with the rotating form rolls 36 (FIG. 1). The compliant roll 48 is rotated about its central axis, which extends parallel to the central axis of the sensor roll 46 and form roll 36, by engagement with the sensor roll. Although it is preferred to have the drive forces for rotating the sensor roll 46 and compliant roll 48 transmitted from the form roll 36 by friction drive between the rolls, it is contemplated that the sensor roll 46 and compliant roll 48 could be driven by gears which drive the rolls of the inker. It is also contemplated that the compliant roll 48 could be disposd in engagement with the form roll 32.

Information indicative of the thickness of the ink film 52 is transmitted from the sensor roll 46 to control circuitry 64 (FIG. 1). The control circuitry 64 is connected with a plurality of motors 66 for rotating the ink fountain keys 22 to maintain a desired ink film thickness.

The film thickness monitor assembly 10 includes a plurality of identical magnets 72 (see FIG. 2) which are arranged in a helical array 74 in the hollow sensor roll 46. The helical array 74 of magnets has only a single 360 degree turn. Although only a few of the magnets 72 have been shown in FIG. 2, the helical array 74 of magnets includes one magnet for each of the plurality of ink fountain keys 22 and rings 60 of the compliant roll 48. The helical array of magnets 74 extends around the sensor roll 46 with each of the magnets 72 circumferentially offset relative to the adjacent magnets. The spatial relationship between the magnets 72 results in a series multiplexing action in which only one of the magnets 72 is adjacent to the nip 50, in the manner shown in FIGS. 3 and 4 at any given time.

Each of the magnets 72 includes a generally U-shaped core 76 (FIG. 4) formed of a material having a relatively high magnetic permeability. In one specific embodiment of the invention, the core 72 was formed of a stack of four laminations of a nickel-iron alloy. The laminations were epoxyed together and had a thickness of approximately 0.006 inch. The exterior of the U-shaped core was 0.7 inches across the back section 80 and 0.6 inches along the leg sections 82 and 84. It should be understood that the foregoing composition and dimensions of the core 76 have been set forth herein only for purposes of clarity of illustration and it is contemplated that the core 76 could be constructed with a composition and dimensions other than this specific composition and dimensions.

The core 76 of the magnet 72 is mounted on a cylindrical side wall 88 of the sensor roll 46 by forming openings 90 and 92 (FIG. 4) extending through the side wall 88. The core 76 is positioned in the openings 90 and 92 by bodies 94 and 96 with a suitable epoxy material. Although the core 76 is formed of a material having a relatively high magnetic permeability, the wall 88 of the sensor roll 46 is formed of a material having a relatively low magnetic permeability, such as aluminum.

A excitation coil 102 is wrapped around the back 80 of the core 76. The excitation coils 102 for the helical array 74 of magnets are interconnected in series and are connected with a constant source of direct current. The constant direct current source results in the magnetic excitation of each of the magnets 72 being constant.

Since the magnets 72 have a constant magnetomotive force, permanent magnets could be substituted for the magnets 72 if desired. In one specific embodiment of the invention, the excitation coil 102 was composed of 100 turns of number 33 magnet wire. The excitation coils 102 for each of the magnets 72 were connected with a 10 volt DC source and were connected in series with a resistance to approximate a constant current source. There was a total resistance through the helical array 74 of magnets of approximately 100 ohms and a constant magnitude excitation current of approximately 0.1 amperes. Of course, the specific construction of the excitation coil 102 and the magnitude of the direct current source and excitation current will be different for different embodiments of the invention. A single coil may be used for both excitation and sensing.

Generation of Induced Voltage

A sensor coil 106 is provided in association with the magnet 72. The sensor coil 106 responds to changes in the flux pattern of the magnetic field emanating from the magnet 72 as the magnet is moved toward and away from an associated one of the rings 60 of material having a relatively high magnetic permeabilty. Thus, whenever the magnet 72 moves toward the nip 50, the magnetic field emanating from the pole ends 108 and 110 is concentrated by the associated ring 60 of material having a high magnetic permeability. As the magnet 72 moves away from the nip 50 in the space between the magnet and the associated ring 60 increases, the magnetic field disperses. The concentrating of the magnetic field as the magnet 72 approaches the nip 50 and dispersing of the magnetic field as the magnet moves away from the nip 50 results in an induced voltage being generated in the sensor coil 106.

Figure 6:
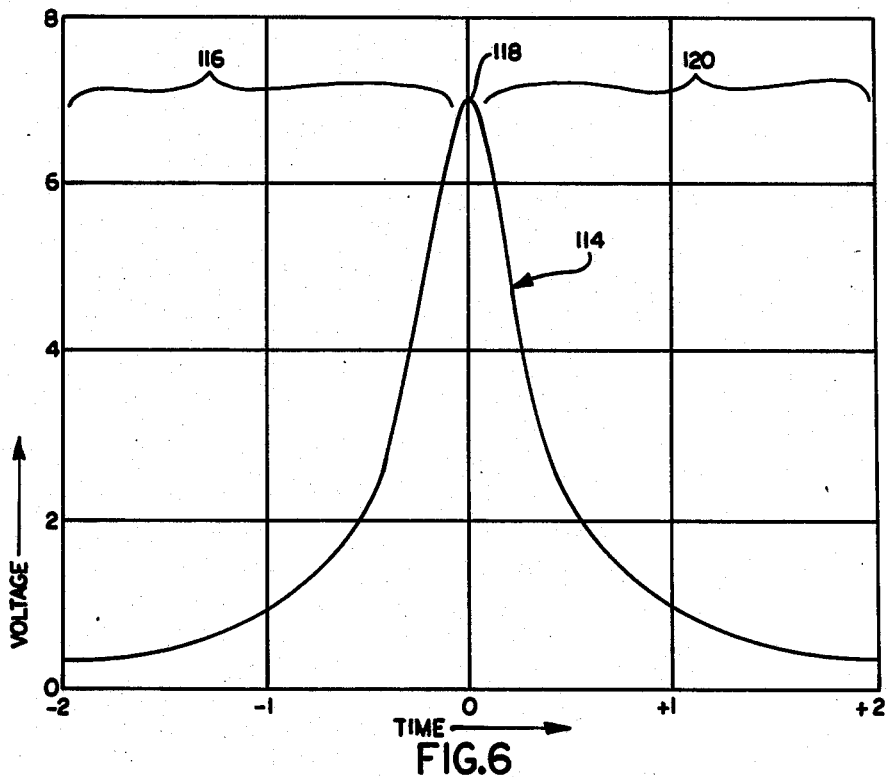
FIG. 6 is a graph depicting the relationship between an induced magnetic flux change generated in a sensor coil and movement of a magnet past the nip between the sensor and compliant rolls.

As the magnet 72 moves toward and away from the nip 50 during relative rotation between the rolls 46 and 48, the induced flux change in the sensor coil 106 varies in the manner indicated by the curve 114 in FIG. 6. Thus, as the magnet 72 approaches the nip, the magnetic flux change in the sensor coil 106 increases in the manner indicated by the portion 116 on the curve 114. When the magnet 72 is disposed in radial alignment with the annular ring 60, a maximum flux change 118 is generated in the sensor coil 106. As the magnet 72 moves away from the nip 50, the induced flux change generated in the sensor coil 106 decreases in the manner indicated by the portion 120 of the curve 114.

The maximum flux change 118 generated in the sensor coil 106 will vary as an inverse function of the distance between the pole ends 108 and 110 (FIG. 4) of the magnet 72 and the cylindrical outer side surface 62 of the annular ring 60, when the magnet 72 is at the nip 50. The distance between the pole ends 108 and 110 of the magnet 72 and the ring 60 when the magnet is at the nip 50, as shown in FIGS. 3 and 4, is equal to the thickness of the ink film 52. Therefore, the maximum flux change generated in the sensor coil 106 varies as an inverse function of the thickness of the ink film 52. Since the ink film 52 has a magnetic permeability which is very near unity, the only characteristic of the ink film 52 which effects the magnitude of the flux change induced in the sensor coil 106 is the thickness of the film.

The magnitude of te induced voltage is determined by the previously set forth equation:

$$V = \frac{M_o N_e N_S I A}{2} \left( \frac{1}{d} \right) \qquad \text{(Equation 5)}$$

wherein:

V is the voltage induced in the sensing coil.
$M_o$ is the free space permeability.
$N_e$ is the number of turns in the excitation coil 102.
$N_S$ is the number of turns in the sensing coil 106.
I is the current in the excitation coil.
A is the area of the pole faces 108 and 110.
d is the gap or distance from the pole faces 108 and 110 to the surface 62 of the ring 60.

The excitation current I is kept constant. A voltage proportional to flux change is produced if the voltage is integrated in a conventional operational amplifier circuit with input resistance R and feedback capacitor C, then the result is:

$$V_o = \frac{M_o N_e N_S I A}{2} RC \left[ \frac{1}{d} \right] \qquad \text{(Equation 6)}$$

For any specific embodiment of the film thickness monitor assembly 10, only the integrated voltage $V_o$ and the distance between the pole faces 108 and 110 and the associated annular ring 60 will vary. Therefore, equation 6 can be written as follows:

$$V_o = \frac{K}{d} \qquad \text{(Equation 7)}$$

Thus, when d is a minimum, that is when the magnet 72 is at the nip 50 as shown in FIGS. 3 and 4, the integral of the induced voltage in the sensor coil 106 is a maximum. By using solid films of a known thickness, the induced voltage generated in the sensor coil 106 of a specific embodiment of the invention can be calibrated to correspond to a particular film thickness. However, one advantage of this method is that the value of K in equation 7 may be directly computed from the known parameters in equation 6 and calibration is not necessary.

In the illustrated embodiment of the invention, the pole faces 108 and 110 are exposed to one side of the ink film 52. This results in the minimum value of d in equations 6 and 7 being equal to the thickness of the ink film 52. However, it is contemplated that the magnets 72 could be mounted with the pole faces 108 and 110 inside the sensor roll 46. If this was done, the minimum distance would be equal to the thickness of the ink film plus a constant equal to the distance which the pole faces 108 and 110 are displaced from the side of the ink film.

Compliant Roll Construction

The steel rings 60 of the compliant roll 48 yield under the influence of pressure applied against the rings by the film 52. Thus, each of the rings 60 is mounted on a plurality of springs 124, 126, and 128 (see FIG. 3). Therefore, each ring 60 is independently movable toward and away from the sensor roll 46 with variations in ink film thickness. This enables each of the magnets 72 in the helical array of magnets 74 (FIG. 2) to cooperate with an associated one of the rings 60 to generate an induced voltage in a sensor coil 106 of a magnitude corresponding to the ink film thickness in the portion of the nip 50 disposed between the ring and the sensor roll 46.

A relatively thin ink film may be present at one location in the nip 50 while a thicker ink film may be present at a location which is axially spaced from the one location. The fluid pressure forces applied against the rings 60 by the ink film 52 are sufficient to cause the ring 60 adjacent to a relatively thick portion of the film to be radially displaced from the nip 50. This allows the ink film monitor assembly 10 to detect variations in the thickness of the ink film across the width of the ink film.

A plurality of polymeric spacer rings 132 are disposed between the rings 60 to hold the rings against axial movement and allow them to move radially in and out relative to a cylindrical base roll 134. Although it is preferred to mount the sensing coils 106 on a core of each of the magnets 72, it is contemplated that the sensing coils could be positioned at other locations. For example, the sensing coils could be positioned in the annular rings 60 if desired. Although the annular rings 60 in the illustrated embodiment of the invention are formed of a magnetic steel, it is contemplated that the rings could be formed of other materials having a relatively high magnetic permeability. Thus the compliant roll could be formed of an elastomeric material containing numerous particles of a material having a high magnetic permeability.

Control Circuitry

Figure 2:
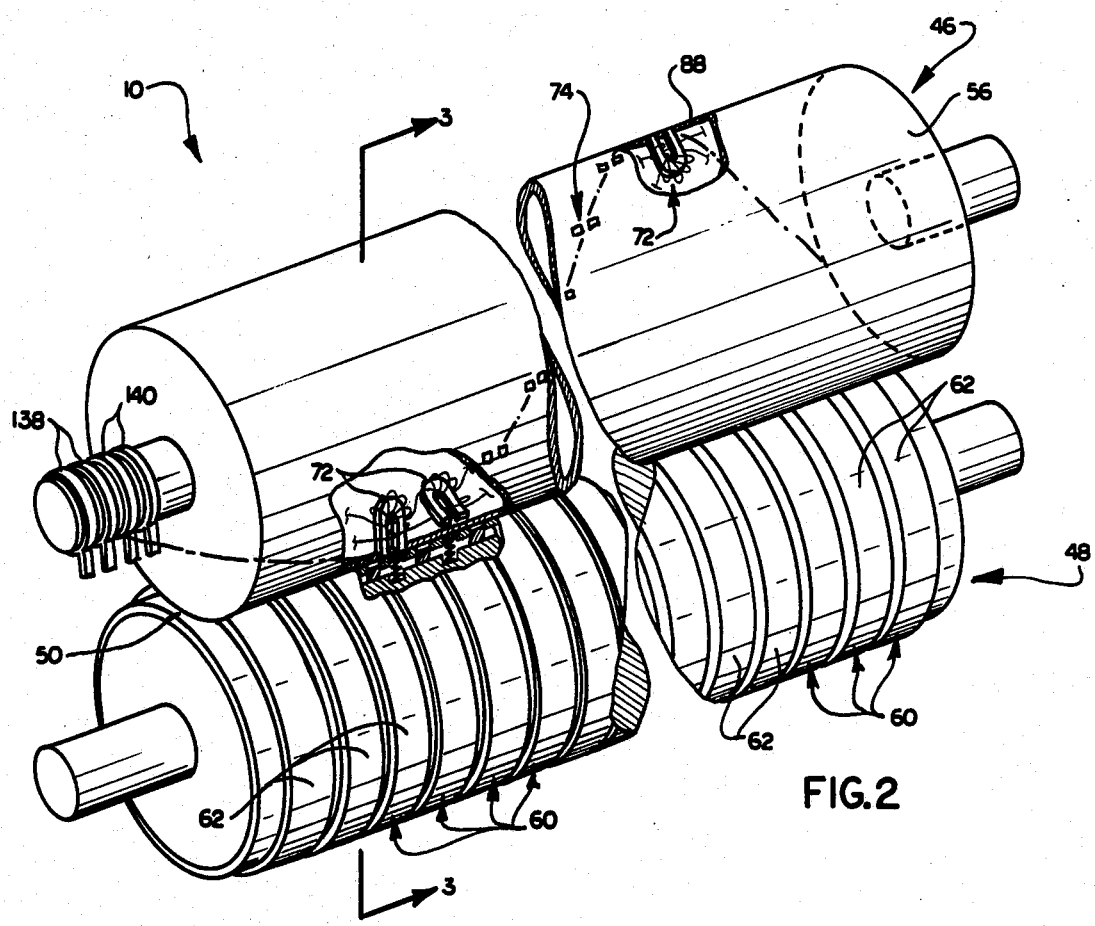
FIG. 2 is a partially broken away schematic fragmentary illustration depicting the relationship between a sensor coil and a compliant roll in the film thickness monitor assembly used in the inker of FIG. 1.

The electromagnets 72 are connected with a constant D.C. current source 136 (FIG. 5) through slip rings 138 (FIG. 2). Therefore, the magnets 72 have a constant magnetomotive force during rotation of the sensor roll 46.

The control circuitry 64 (see FIG. 5) receives the output of the sensor coils 106 for each of the magnets 72 in turn. Thus, the sensor coils 106 are connected in series with each other. Since the magnets 72 are disposed in a helical array in the sensor roll 46, the magnets 72 are moved one at a time to the nip 50. Therefore, even though the sensor coils 106 are connected in series, only one sensor coil 106 is provided an induced voltage output signal indicative of the thickness of a portion of the ink film 52 at any particular time during rotation of the sensor roll 46.

The sensor coils 106 are connected, through slip rings 140 (FIG. 2), with an operational amplifier 142 in a filter and integrating circuit 144 through input resistors 146 and 148. An R-C feedback network 150 is connected across the operational amplifier 142. The output from the operational amplifier 142 is connected with a sampling circuit 154 and a phase synchronization circuit 156.

Figure 5:
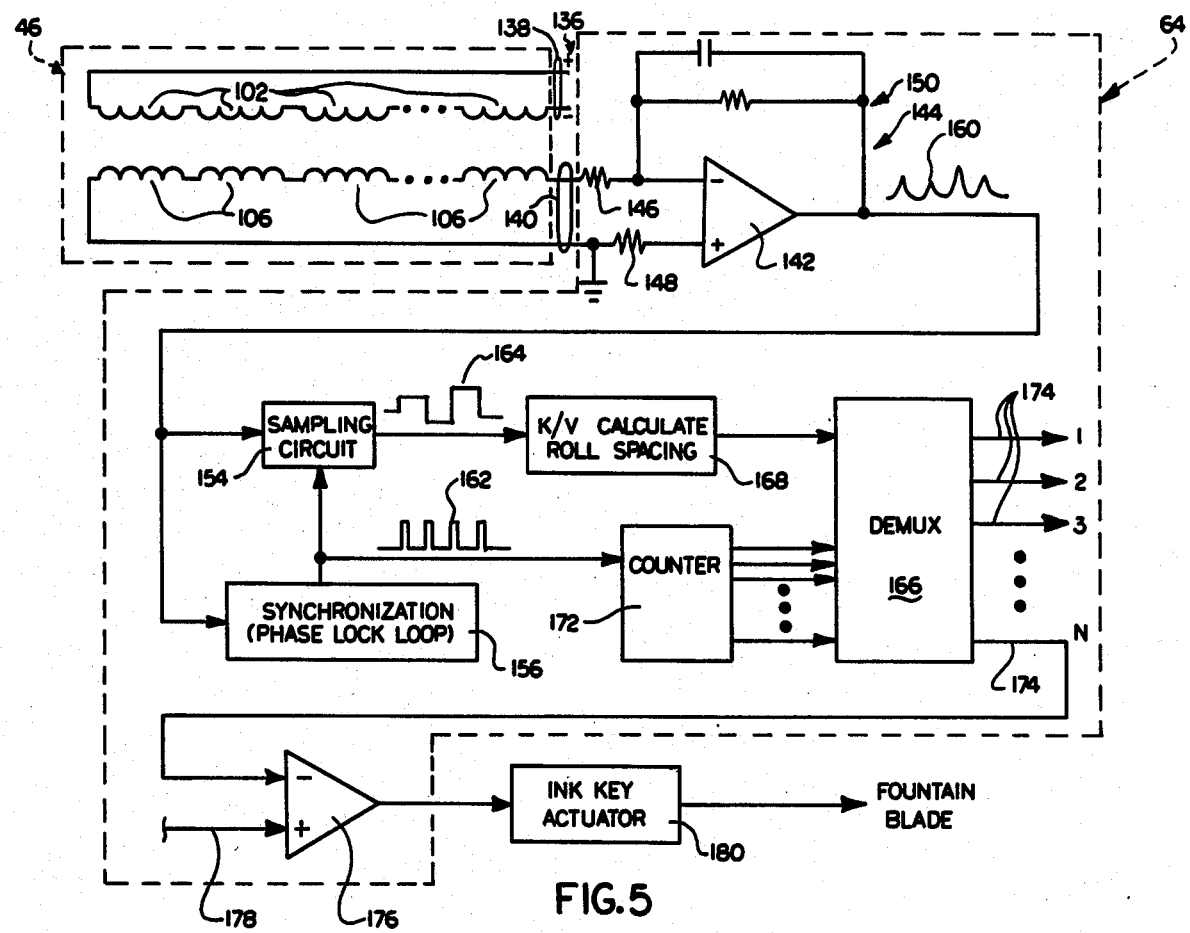
FIG. 5 is a schematic illustration of control circuitry used in the film thickness monitor assembly.

The output from the operational amplifier 142 has a waveform, illustrated at 160 in FIG. 5, with peaks corresponding to the maximum induced voltage generated in each of the sensor coils 106 in turn. During operation of the printing press 14, the sensor roll 46 and compliant roll 48 will be rotating at substantially constant speeds. Therefore, the voltage peaks of the waveform 106 will occur with a uniform frequency.

The output from the synchronization circuit 156 is a series of voltage spikes, indicated at 162 in FIG. 5, of the same frequency as the voltage peaks 160. The output from the synchronization circuit 156 causes the sampling circuit 154 to shift the level of a squarewave output, indicated at 164 in FIG. 5 to correspond to peaks of the induced voltage output signal from the operational amplifier 142. This results in the magnitude of the squarewave 164 varying in accordance with variations in the maximum induced voltage generated in each of the sensor coils 106 in turn.

The output from the sampling circuit 154 is transmitted to a demultiplexer 166 through a function generator 168. The transfer function for the function generator is $d = K/v$ where v is the input to the function transfer generator 168. The output from the synchronization circuit 156 is transmitted to a counter 172. The counter 172 indexes the demultiplexer 166 to transmit a voltage signal corresponding to the thickness of a film over each of a plurality of output lines in turn.

The voltage which is transmitted over each of the output lines 174 in turn effects actuation of the ink fountain keys 22 to maintain a desired ink film thickness between the sensor roll and each of the rings 60 on the compliant roll 48. Thus, the voltage signal on the demultiplexer output line 174 designated as N in FIG. 5 is transmitted to a comparator 176. The other input terminal of the comparator or operational amplifier 176 is connected with a line 178 over which a voltage signal corresponding to the desired thickness of the ink film is transmitted. If the signal on the line N representing the actual thickness of the ink film differs from the signal representing the desired thickness of the film, the ink key actuator 180 is energized to move the ink key 22 and adjust the ink fountain blade. The ink key actuator 180 includes the motor 66 (see FIG. 1).

Although only the comparator 176 associated with the output line designated N has been illustrated in FIG. 5, similar comparators are associated with the other output lines 174 and ink fountain keys 22. Therefore, each of the ink fountain keys 22 can be actuated to maintain a desired film thickness at each of the rings 60.

Second Embodiment

In the embodiment of the invention shown in FIGS. 1-4, the compliant roll 48 has rings 60 which are yieldably supported by springs 124, 126 and 128. In the embodiment of the invention shown in FIG. 7, the ring of material having a high magnetic permeability is supported by a body of elastomeric material. Since the embodiment of the invention shown in FIG. 7 is generally similar to the embodiment of the invention shown in FIGS. 1-4, similar numerals will be utilized to designate similar components, the suffix letter "a" being associated with the numerals of FIG. 7 to avoid confusion.

A compliant roll 48a includes a base roll 134a upon which a ring 60a of material having a high magnetic permeability is supported by a sleeve 186 formed of elastomeric material. The sleeve 186 resiliently grips the outer side surface of the base roll 134a. An inner side surface 188 of the ring 60a is resiliently gripped by the outer side surface of the sleeve 186. The elastomeric sleeve 186 is radially yieldable to enable the ring 60a to move radially relative to the base roll 134a. A plurality of holes 90 are formed in the sleeve 186 to provide space for receiving material of the sleeve as it is resiliently compressed by forces applied against the ring 60a by a film.

SUMMARY

In view of the foregoing description it is apparent that the present invention provides a method and apparatus 10 for monitoring the thickness of a film. The apparatus 10 includes a sensor roll 46 and a compliant roll 48 which cooperate to define a nip 50 through which the film 52 passes. Each magnet 72 of a series 74 of magnets on the sensor roll 46 is moved in turn past the nip 50. Each of the magnets 72 is of a constant magnetic strength and cooperates with a body of material having a relatively high magnetic permeability as the magnet passes by the nip 50. As a magnet 72 is moved by the nip, the magnetic field is concentrated and an induced voltage is generated in a sensor coil 106. The maximum magnitude of the induced voltage varies as an inverse function of the thickness of the film 52 at the portion of the nip 50 between the magnet 72 and the compliant roll 48.

Although a film thickness monitor assembly 10 constructed in accordance with the present invention can be used in many different environments to detect the thickness of either liquid or solid films, the assembly is advantageously used in a printing press 14 to detect the thickness of a liquid film 52 of ink applied to a plate cylinder 16. When the film thickness monitor assembly 10 is used in a printing press, the output from the sensor coil 106 is transmitted to control circuitry 64 which effects operation of ink fountain keys 22 to maintain a desired film thickness. The magnets 72 are advantageously arranged in a helical array in the sensor roll 46 to obtain a series multiplexing action due to movement of each magnet in turn past the nip 50.

Having described specific preferred embodiments of the invention, the following is claimed:

1. An apparatus for monitoring the thickness of a film of liquid, said apparatus comprising a first roll which is rotatable about a first axis, said first roll including material having a relatively high magnetic permeability, a second roll which is rotatable about a second axis, said second roll cooperating with said first roll to form a nip through which the film of liquid passes, means for rotating said first roll about the first axis and said second roll about the second axis, a plurality of magnets mounted in said second roll at locations which are spaced apart along the second axis so that rotation of said second roll moves said magnets toward and away from the nip along circular paths which are spaced apart along the width of the film, said magnets being spaced apart about the circumference of said second roll whereby rotation of said second roll moves each of said magnets in turn to a location on its circular path of movement in which it is closest to the nip, and a plurality of sensor means, each of said magnets having an associated sensor means for sensing the flux density of its magnetic field provided upon movement of the associated magnet to the location on its path of movement which is closest to the nip and which flux density is representative of the thickness of the film of liquid, and to generate a signal representative of film thickness.

2. An apparatus as set forth in claim 1 wherein said material having a relatively high magnetic permeability includes a plurality of sections having cylindrical outer side surfaces which engage the film of liquid and which cooperate with said second roll to form the nip through which the film of liquid passes, said first roll including means for enabling each of said sections to be radially offset relative to adjacent sections under the influence of fluid pressure forces applied to said first roll by the film of liquid.

3. An apparatus as set forth in claim 2 further including liquid film thickness control means for varying the thickness of a longitudinally extending area of the film which engages one of the sections of said first roll.

4. An apparatus as set forth in claim 3 wherein the path of movement of each of said magnets is disposed radially outwardly of a different one of the sections of said first roll.

5. An apparatus as set forth in claim 1 wherein each of said magnets includes a core member connected with said second roll for rotation therewith about the second axis and an excitation coil extending around said core member, said apparatus further including means for connecting each of said excitation coils with a source of direct current to maintain the magnetomotive force of each of said magnets substantially constant during rotation of said second roll.

6. An apparatus as set forth in claim 5 wherein said sensor means includes a plurality of sensor coils each of which extends around one of said core members.

7. The apparatus of claim 5 wherein the excitation coils of the magnets are electrically connected in series across said source of direct current.

8. The apparatus of claim 7 wherein the sensor means are electrically connected in series, said apparatus further including a demultiplexing means connected to the series connected sensor means for separately generating a signal indicative of the flux density monitored by each sensor means.

9. The apparatus of claim 8 further including liquid film thickness control means responsive to the signals generated by said demultiplexing means for varying the thickness of the liquid film in an area corresponding to the area being monitored by the demultiplexing means.

10. An apparatus for monitoring the thickness of a film of ink, said apparatus comprising:
 a first member formed of material having a relatively high magnetic permeability and disposed on a first side of the film;

magnetic means for providing a magnetic field having a substantially constant magnetomotive force and having a flux density, said magnetic means disposed on a second side of the film;

means for effecting relative movement between said magnetic means and said first member such that said magnetic means and said first member approach to a distance which is a function of the film thickness, said magnetic field interacting with said first member at said distance such that said flux density varies in accordance with said distance; and sensor means for sensing the flux density of said magnetic field at said distance and for generating a signal indicative thereof;

wherein said first member is a first roller which is rotatable about a first axis and which has a first circular outer surface engageable with a first side of the film of ink, said apparatus further including a second roller which is rotatable about a second axis and which has a second circular outer surface engageable with a second side of the film of ink, said magnet means being disposed within said second roller and being connected with said second roller for movement with said second roller, said means for effecting relative movement being operable to (i) move at least one of said rollers away from the other of said rollers under the influence of fluid pressure forces applied against said one roller by the film of ink upon an increase in the thickness of the film of ink and (ii) rotate said second roller about the second axis to move said magnet means towards said first roller to said distance.

11. An apparatus for monitoring the thickness of a film of ink, said apparatus comprising:

a first member formed of a material having a relatively high magnetic permeability and disposed on a first side of the film;

magnetic means for providing a magnetic field having a substantially constant magnetomotive force and having a flux density, said magnetic means disposed on a second side of the film;

means for effecting relative movement between said magnetic means and said first member such that said magnetic means and said first member approach to a distance which is a function of the film thickness, said magnetic field interacting with said first member at said distance such that said flux density varies in accordance with said distance; and sensor means for sensing the flux density of said magnetic field at said distance and for generating a signal indicative thereof;

wherein said first member is a first roll which is rotatable about a first axis and has first surface means for engaging a first side of the film, said apparatus further including a second roll which is rotatable about a second axis which is parallel to said first axis and which has second surface means for engaging a second side of the film, said first and second surface means cooperating to define a nip through which the film passes, said magnet means including a plurality of magnet members carried by said second roll and disposed adjacent said second surface means in a helical array about the second axis, said means for effecting relative movement being operable to rotate said second roll about said second axis to move each of said magnet members in turn to and from said distance.

12. A method of monitoring the thickness of a film of liquid, said method comprising the steps of moving the film of liquid through a nip formed between first and second rolls by rotating the first and second rolls about their central axes, providing a magnet carried by said second roll, said magnet producing a magnetic field having a substantially constant magnetomotive force and having a flux density, providing a relatively high magnetically permeable material carried by said first roll, rotating said first roll and said second roll to move the magnet and said magnetically permeable material to a distance that is a function of the film thickness, said flux density varying as a function of said distance, and sensing the flux density of said magnetic field at said distance and generating a signal representative thereof, the signal generated when said magnet and said magnetically permeable material are at said distance being indicative of the film thickness.

13. A method as set forth in claim 12 further including the step of varying the thickness of the liquid film as a function of the flux density to maintain a desired liquid film thickness.

14. An apparatus for monitoring the thickness of a film of liquid, said apparatus comprising first and second rolls having outer surfaces which cooperate to form a nip, means for rotating the first and second rolls about their central axes to move the film of liquid through the nip, a relatively high, magnetically permeable material carried by said first roll, a magnet carried by said second roll for rotation therewith about the central axis of said second roll for providing a magnetic field having a substantially constant magnetomotive force and having a flux density, said flux density varying as a function of the distance between said magnet and the relatively high, magnetically permeable material, sensor means associated with said magnet for sensing the flux density of said magnetic field and generating a signal indicative thereof, said magnet being movable by rotation of said second roll in a direction toward the nip thereby increasing the flux density, said magnet being movable by rotation of said second roll in a direction away from the nip thereby decreasing the flux density, the maximum flux density being indicative of the thickness of the film of liquid.

15. An apparatus as set forth in claim 14 wherein said magnet includes a core member and an excitation coil extending around said core member, said apparatus further including circuit means for connecting said excitation coil with a source of direct current to maintain a constant magnitude flow of current through said excitation coil during rotation of said first roll.

16. An apparatus as set forth in claim 14 further including means for varying the thickness of the liquid film as a function of the flux density to maintain a desired liquid film thickness.

* * * * *